UNITED STATES PATENT OFFICE.

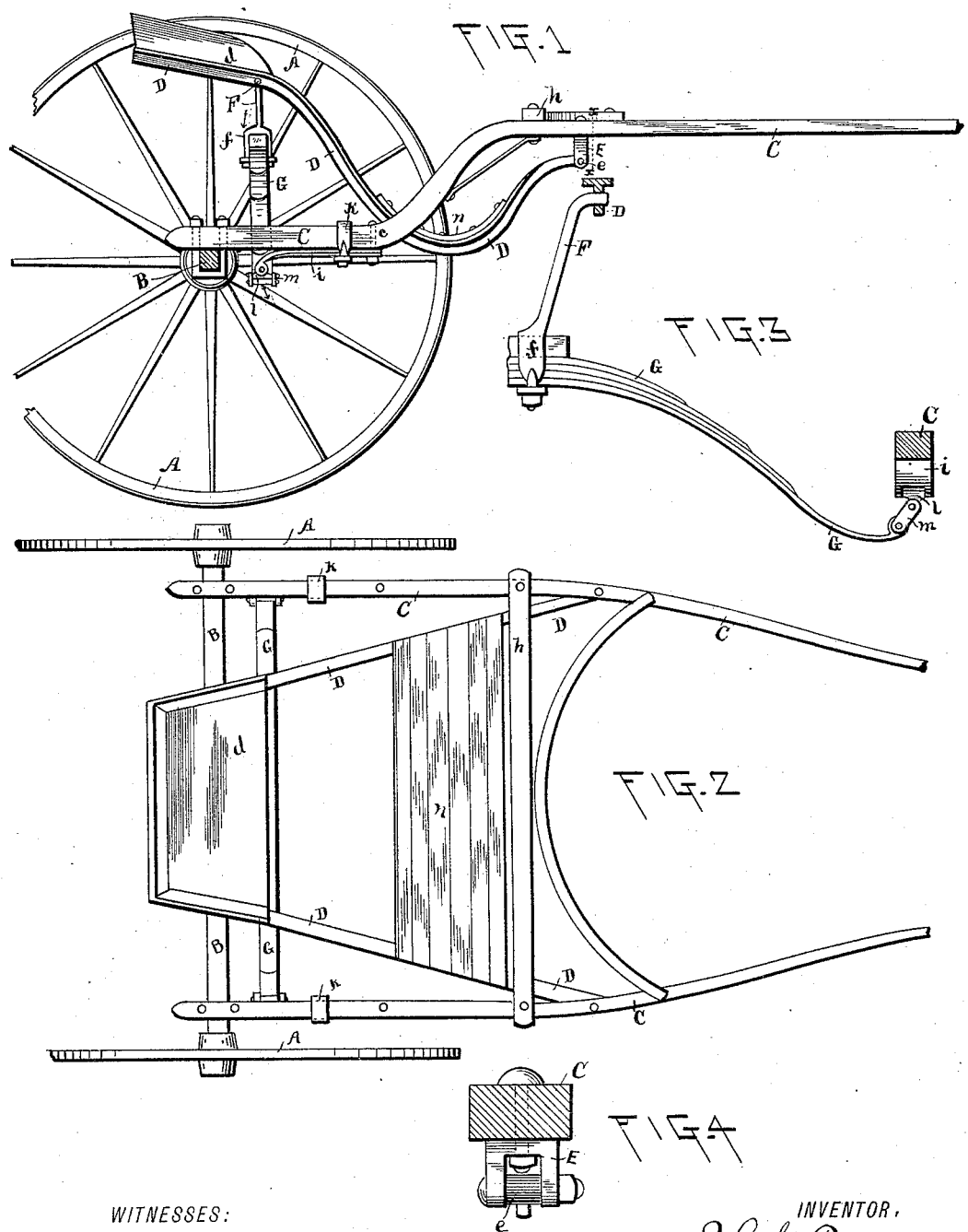

JOHN G. PARSONS, OF COLUMBUS, OHIO.

TWO-WHEELED VEHICLE.

SPECIFICATION forming part of Letters Patent No. 397,515, dated February 12, 1889.

Application filed June 13, 1888. Serial No. 276,944. (No model.)

*To all whom it may concern:*

Be it known that I, JOHN G. PARSONS, a citizen of the United States, residing at Columbus, in the county of Franklin and State of Ohio, have invented a certain new and useful Improvement in Two-Wheeled Vehicles, of which the following is a specification.

My invention relates to the improvement of two-wheeled vehicles or road-carts, and has particular relation to the construction and arrangement of the parts forming a spring-support for the seat.

The objects of my invention are to provide a vehicle of this class with a neat and simple form of spring-support, so constructed and arranged as to contribute comfort and ease to the driver and prevent the twisting, spreading, or separation of the leaves of the spring.

These objects I accomplish in the manner illustrated in the accompanying drawings, in which—

Figure 1 is a side elevation of my improved cart. Fig. 2 is a plan view of the cart. Fig. 3 is an enlarged rear view of a portion of the main seat-spring, and Fig. 4 is an enlarged sectional view taken on line $x\,x$ of Fig. 1.

Similar letters refer to similar parts throughout the several views.

In the figures mentioned, A represents the wheels of a two-wheeled vehicle or road-cart, B the axle, and C the shafts.

D represents the seat-bars, having secured to the upper sides of their rear portions a suitable form of seat, $d$, from which said bars extend forward in downwardly and thence upwardly curved diverging lines to points beneath the shafts, as shown. Each of the seat-bars D has its forward end pivoted to a bolt, $e$, held between the downwardly-extending arms of a hanger, E, secured to the under side of the adjacent shaft-bar.

F F represent seat-rods having their upper bent ends pivoted, respectively, in transverse holes or sockets formed in oppositely-located points in the seat-bars beneath the front portion of the seat $d$. Each of these rods F, extending downwardly, has formed on its lower end a clip-extension, $f$. These clips are made to embrace the leaves of a transverse spring, G, at points adjacent to and on each side of the center of the length of said spring G. The rear ends of the shaft-bars C are secured in any suitable manner to the upper side of the axle, from which they extend forwardly to points $c$ slightly in rear of the front line of the wheels A, when they are bent upwardly in a curved line and thence forwardly, being connected by the usual cross-bar, $h$.

Bolted to each of the shaft-bars C at or near the points $c$ is the front end of a metal spring, $i$, which, extending rearwardly, has its front portion further secured against the under side of the shaft-bar by means of a clip, $k$, passing about the shaft-bar and embracing said spring. The rear end of this spring $i$ is provided with a shackle, $l$, which is pivotally secured to corresponding ends of two short parallel link-bars, $m$, the remaining ends of which are pivotally secured to a bolt passing transversely through the end of the spring G.

A suitable foot board or boards, $n$, may be made to extend transversely between the seat-bars D.

It will be seen that the weight of a person upon the seat $d$ will operate to depress the spring G, and at the same time produce a tendency of the latter to move forward.

By the above-described connection of the ends of the springs G and $i$ and the pivotal connection of the former with the seat it will be seen that said spring G may not only be depressed, but allowed, through a depression of the spring $i$, to follow its tendency to move forward, its outer ends describing the arc of a circle.

It is obvious that this freedom of movement of the spring G will operate to prevent the tendency of the leaves of said spring to separate or twist out of place, thus obviating a fault found to exist where the spring is prevented from following its tendency to move forward, as above mentioned.

It will also be observed that the addition of the spring $i$ to the usual spring, G, is equivalent to lengthening the spring usually employed, thus insuring ease and comfort to the driver.

Having now fully described my invention, what I claim, and desire to secure by Letters Patent, is—

In a two-wheeled vehicle, the combination, with the axle, shafts, and seat, of a transverse spring, G, pivotally supported beneath the seat, as described, and the springs $i$, held at their front ends against the under sides of the shaft-bars, and pivotally connected at their remaining ends with the spring G, substantially as and for the purpose specified.

JOHN G. PARSONS.

In presence of—
JOHN M. TIBBETTS,
C. C. SHEPHERD.